United States Patent
Gregg et al.

(10) Patent No.: US 8,125,181 B2
(45) Date of Patent: Feb. 28, 2012

(54) METHOD AND APPARATUS FOR HYBRID VEHICLE AUXILIARY BATTERY STATE OF CHARGE CONTROL

(75) Inventors: Christopher B. Gregg, Gardena, CA (US); Yusuke Kamijo, Gardena, CA (US); Yoshikatsu Nakamura, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 802 days.

(21) Appl. No.: 12/212,552

(22) Filed: Sep. 17, 2008

(65) Prior Publication Data

US 2010/0066302 A1    Mar. 18, 2010

(51) Int. Cl.
- *H02J 7/14* (2006.01)
- *B60W 10/24* (2006.01)
- *H05K 7/14* (2006.01)

(52) U.S. Cl. ..... 320/104; 320/116; 320/139; 180/65.29; 307/149

(58) Field of Classification Search ............ 320/104
See application file for complete search history.

(56) References Cited

U.S. PATENT DOCUMENTS

| | | |
|---|---|---|
| 3,395,288 A | 7/1968 | Von Brimer |
| 3,568,175 A | 3/1971 | Schwehr et al. |
| 3,991,357 A | 11/1976 | Kaminski |
| 4,218,717 A | 8/1980 | Shuster |
| 4,493,001 A | 1/1985 | Sheldrake |
| 4,902,956 A * | 2/1990 | Sloan .......................... 320/135 |
| 5,140,250 A | 8/1992 | Morland |
| 5,159,257 A | 10/1992 | Oka et al. |
| 5,272,380 A | 12/1993 | Clokie |
| 5,296,997 A | 3/1994 | Betton et al. |
| 5,327,068 A | 7/1994 | Lendrum et al. |
| 5,381,295 A | 1/1995 | Rund et al. |
| 5,615,076 A | 3/1997 | Slepian et al. |
| 5,691,619 A | 11/1997 | Vingsbo |
| 5,717,310 A * | 2/1998 | Sakai et al. ............... 307/10.1 |
| 5,764,469 A * | 6/1998 | Slepian et al. ............. 361/92 |
| 5,977,652 A * | 11/1999 | Frey et al. ................ 307/10.1 |
| 6,249,106 B1 | 6/2001 | Turner et al. |
| 6,362,599 B1 * | 3/2002 | Turner et al. .............. 320/135 |
| 6,424,157 B1 | 7/2002 | Gollomp et al. |
| 6,435,294 B1 | 8/2002 | Hara et al. |
| 6,474,296 B2 | 11/2002 | Cornell et al. |
| 6,727,676 B2 | 4/2004 | Ochiai |
| 6,762,513 B2 | 7/2004 | Landgraf et al. |
| 6,766,874 B2 * | 7/2004 | Naito et al. ............... 180/65.26 |
| 6,816,759 B2 | 11/2004 | Kimura |
| 6,879,895 B2 | 4/2005 | Capps et al. |
| 6,917,502 B2 | 7/2005 | Enzinna et al. |
| 7,064,525 B2 | 6/2006 | Pachciarz et al. |
| 7,267,191 B2 * | 9/2007 | Xu et al. ................ 180/65.245 |
| 2003/0210014 A1 * | 11/2003 | Jabaji et al. .............. 320/104 |
| 2004/0232881 A1 * | 11/2004 | Amano et al. ............. 320/104 |
| 2005/0024061 A1 | 2/2005 | Cox et al. |
| 2006/0049797 A1 | 3/2006 | Hope et al. |
| 2007/0247106 A1 * | 10/2007 | Kawahara et al. ......... 320/104 |

* cited by examiner

*Primary Examiner* — Yalkew Fantu

(74) *Attorney, Agent, or Firm* — Snell & Wilmer LLP

(57) ABSTRACT

The present invention relates to a method and an apparatus for hybrid vehicle auxiliary battery state of charge control. In one embodiment, the present invention is an automobile including an electronic accessory, a first battery connected to the electronic accessory, and a control unit connected to the first battery, the control unit monitoring the first battery and disconnecting the first battery from the electronic accessory when the first battery is in a first operational condition.

16 Claims, 2 Drawing Sheets

METHOD AND APPARATUS FOR HYBRID VEHICLE AUXILIARY BATTERY STATE OF CHARGE CONTROL

BACKGROUND

1. Field

The present invention relates to a method and an apparatus for hybrid vehicle auxiliary battery state of charge control.

2. Background

In an automobile, a user can often activate and use accessories in the automobile such as a radio or a light, even when the engine is not activated. This can drain a battery of the automobile such that the user is unable to start the engine of the automobile.

Thus, there is a need for a method and apparatus to reduce the likelihood of the battery being drained such that the user is unable to start the engine of the automobile.

SUMMARY

In one embodiment, the present invention is an automobile including an electronic accessory, a first battery connected to the electronic accessory, and a control unit connected to the first battery, the control unit monitoring the first battery and disconnecting the first battery from the electronic accessory when the first battery is in a first operational condition.

In another embodiment, the present invention is an automobile including an electronic accessory, a first battery connected to the electronic accessory, an engine configured to be in an active or inactive state, a control unit connected to the first battery and the engine, the control unit monitoring the first battery, disconnecting the first battery from the electronic accessory when the first battery is in a first operational condition, and providing a warning to a user when the first battery is in a second operational condition.

In yet another embodiment, the present invention is a method for controlling state of charge in an auxiliary battery in an automobile including the steps of monitoring an operation condition of the auxiliary battery, and disconnecting the auxiliary battery from electronic accessories when the auxiliary battery is in a first operation condition.

BRIEF DESCRIPTION OF THE DRAWINGS

The features, objects, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
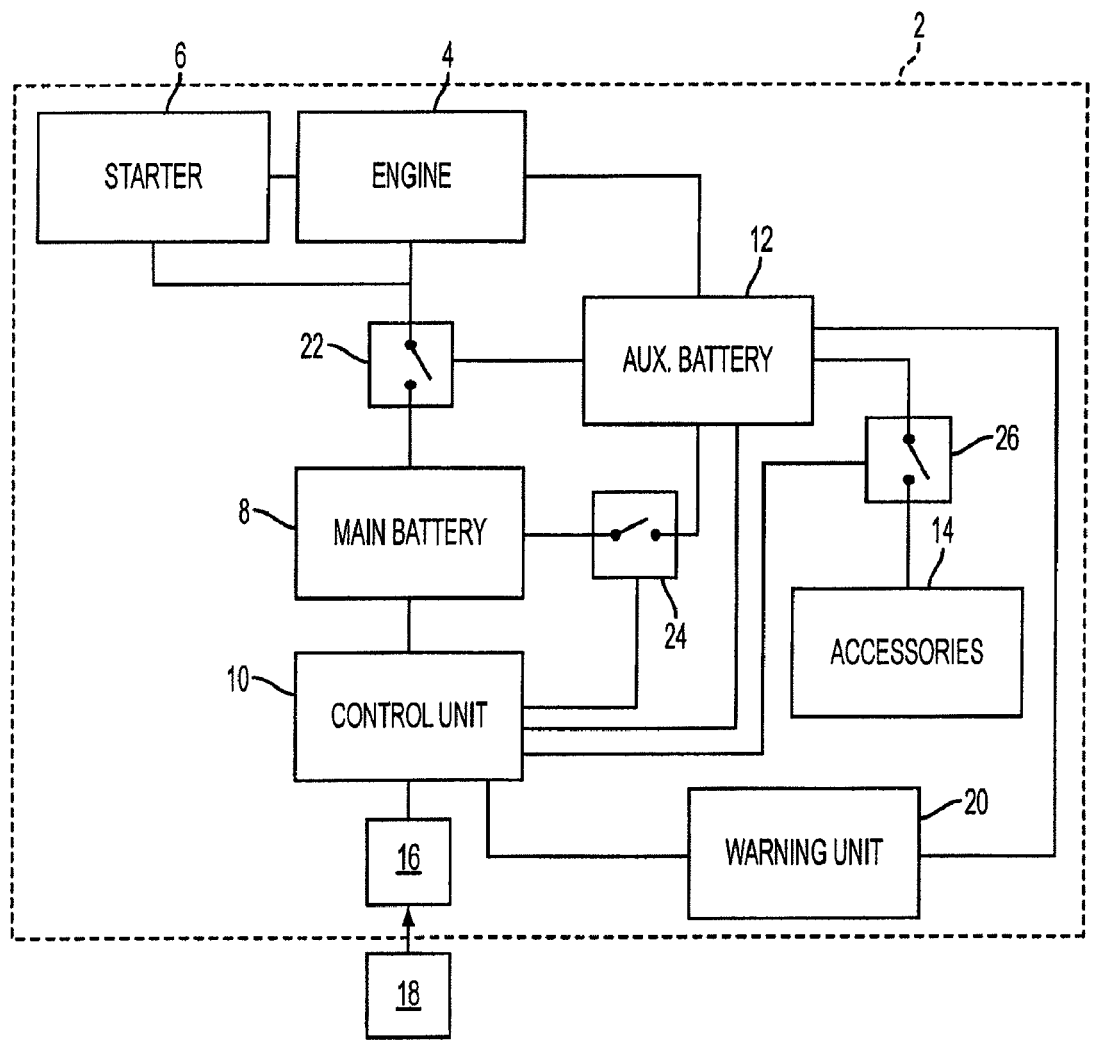
FIG. 1 is a schematic diagram of an embodiment of the present invention.

FIG. 1 is a schematic diagram of an embodiment of the present invention. As seen in FIG. 1, an automobile 2 can include an engine 4, a starter 6, a main battery 8, a control unit 10, an auxiliary battery 12, accessories 14, a key reception unit 16, and a warning unit 20.

As depicted in FIG. 1, automobile 2 is a hybrid car. Although automobile 2 is a hybrid car, automobile 2 can be, for example, any suitable car for transportation such as a car with a conventional internal combustion engine, and/or a car with a hydrogen engine.

Engine 4 can be an internal combustion engine suitable for use in a hybrid car. Engine 4 can also be an electric engine or an engine to process hydrogen, ethanol, or other types of fuel. Engine 4 is connected to starter 6, auxiliary battery 12, and main battery 8 through a switch 22. Engine 4 can be in an active state or inactive state. In an inactive state, engine 4 is off and is not running while in an active state, engine 4 is on and is running.

Starter 6 is connected to engine 4. It is also connected to main battery 8 through switch 22 which can be either engaged or disengaged. Starter 6 can start engine 4 through electricity supplied by main battery 8 when switch 22 is engaged. Starter 6 can include, for example, spark plugs.

Main battery 8 is connected to control unit 10, engine 4 and starter 6 through switch 22, and auxiliary battery 12 through switch 24. Main battery 8 can be, for example, a high voltage battery. Main battery 8 can supply electricity to engine 4 and/or starter 6 when switch 22 is engaged. Furthermore, when engine 4 is active and switch 22 is engaged, main battery 8 can provide power to aid engine 4 in moving automobile 2. Also when switch 22 is disengaged, electricity from main battery 8 does not flow to engine 4 and/or starter 6. Advantageously this can improve the safety of automobile 2 by preventing accidental discharges to engine 4 and/or starter 6 since main battery 8 can be a high voltage battery. With regards to switch 24, when switch 24 is engaged, main battery 8 can supply electricity to auxiliary battery 12. When switch 24 is disengaged, electricity does not flow from main battery 8 to auxiliary battery 12.

Auxiliary battery 12 is connected to engine 4, accessories 14, control unit 10, and switch 22. Auxiliary battery 12 is also optionally connected to main battery 8. Auxiliary battery 12 can be a battery with a smaller energy storage capacity than main battery 8. Advantageously this could reduce the weight of automobile 2 which can be particularly useful when automobile 2 is a hybrid car. In one embodiment, auxiliary battery 12 is a 12 volt battery. Auxiliary battery 12 may be connected to main battery 24 through switch 24 and accessories 14 through switch 26. Switch 24 and switch 26 can be configured to be engaged or disengaged. As noted, when switch 24 is engaged, electricity can flow from main battery 8 to auxiliary battery 12. When switch 24 is disengaged, electricity may not flow from main battery 8 to auxiliary battery 12. Advantageously this can improve the safety of automobile 2 since main battery 8 can be a high voltage battery.

When switch 26 is engaged, auxiliary battery 12 can supply electricity to accessories 14. When switch 26 is disengaged, electricity can be prevented from flowing to accessories 14. Advantageously, this can reduce the amount of electricity used by accessories 14 and prevent auxiliary battery 12 from being depleted or drained, such as when engine 4 is inactive or off. When engine 4 is active, engine 4 can recharge and replenish auxiliary battery 12. Furthermore, auxiliary battery 12 can also control switch 22 by supplying electricity to engage or disengage switch 22. As previously noted, the engagement of switch 22 allows main battery 8 to supply power to start engine 4 using starter 6.

Key reception unit 16 is connected to control unit 10 and can accept a key 18 which can engage key reception unit 16. Key 18 can engage key reception unit 16 either physically, such as when key 18 is physically placed inside key reception unit 16, or wirelessly, such as when key 18 transmits a signal to key reception unit 16 and/or key 18 establishes communication with key reception unit 16. Key 18 can engage key reception unit 16 in two or more states such as an ACCESSORIES ON state or an ENGINE ON state.

In the ACCESSORIES ON state, accessories 14 can be activated. It is also contemplated that some accessories 14 can be activated without key 18 being engaged with key reception unit 16, or without key 18 being engaged with key reception unit 16 in the ACCESSORIES ON state. In such a case, the remaining accessories can be engaged when key 18 is engaged with key reception unit 16 in the ACCESSORIES ON state. During the ACCESSORIES ON state, engine 4 is inactive. The ACCESSORIES ON state can also be referred to as the READY OFF state.

In the ENGINE ON state, engine 4 is activated. Furthermore, during the ENGINE ON state, auxiliary battery 12 can supply electricity to accessories 14 and engine 4 can recharge auxiliary battery 12. The ENGINE ON state can also be known as the READY ON state.

Warning unit 20 is connected to control unit 16 and/or auxiliary battery 12. Warning unit 12 can be, for example, an audio emission device, a video display, and/or a combination of the audio emission device and the video display. Thus, warning unit 12 can provide a warning to a user such as an audio warning, visual warning, or and audiovisual warning to the user.

Accessories 14 are connected to auxiliary battery 12 through switch 26. Accessories 14 can be radios, lights, video players, etc. Accessories 14 can draw power from auxiliary battery 12 when switch 26 is engaged. If switch 26 is disengaged, accessories 14 is effectively disconnected from auxiliary battery 12 and power from auxiliary battery 12 to accessories 14 is cut off.

Control unit 10 is connected to main battery 8, auxiliary battery 12, switch 24, switch 26, key reception unit 16, and warning unit 20. Control unit 10 can be an engine control unit, a microprocessor, an on-board diagnostics system, a computer chip, and/or any other device that can control or monitor the functions and/or components of automobile 2. Control unit 10 can thus monitor auxiliary battery 12 and determine the voltage, power, and/or current level of auxiliary battery 12. Furthermore, control unit 10 can also instruct auxiliary battery 12 to supply power to engage or disengage switch 22. Control unit 10 is also connected to key reception unit 16 and receives a signal from key reception unit 16 regarding the engagement of key 18 to key reception unit 16. Based on the signal, control unit 16 can also control switch 24 and switch 26 to engage or disengage appropriately. Control unit 10 can also determine whether key 18 is engaged with key reception unit 16 in an ENGINE ON state or ACCESSORIES ON state.

Control unit 10 also controls warning unit 20 to display or sound an alarm at appropriate times. By selectively controlling switch 26 and warning unit 20, control unit 10 can warn a user when accessories 14 should be turned off and also when auxiliary battery 12 will be disconnected from accessories 14. Control unit 10 can also warn a user to activate engine 4 so that auxiliary battery 4 can be replenished. By disconnecting auxiliary battery 12 from accessories 14, the present invention can advantageously preserve a sufficient state of charge within auxiliary battery 12 to engage switch 22 when a user wishes to drive automobile 2. Otherwise, if auxiliary battery 12 is drained, then auxiliary battery 12 may not have a sufficient state of charge to engage switch 22 to allow main battery 8 to start engine 4 using starter 6.

Figure 2:
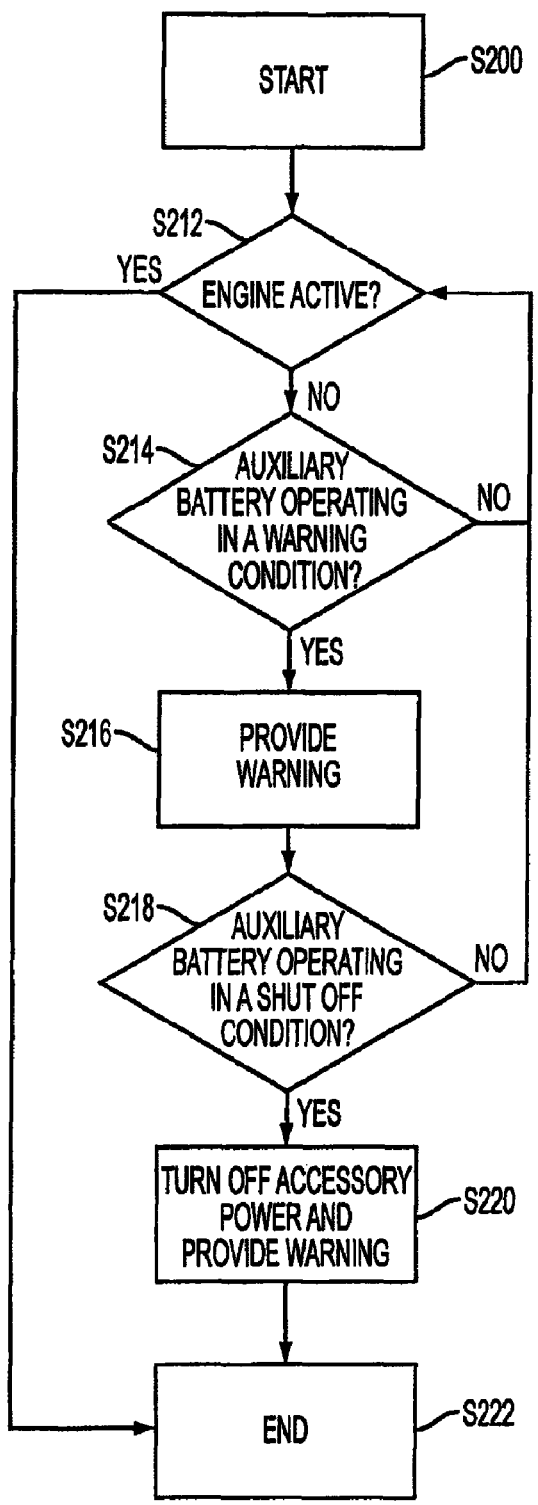
FIG. 2 is a flow chart of an embodiment of the present invention in operation.

FIG. 2 is a flow chart of an embodiment of the present invention in operation. As seen in FIG. 2, the process begins in step S200. In step S212, control unit 10 determines whether engine 4 is active or not. Engine 4 can be active, for example, when key 18 is engaged with key reception unit 16 in an ENGINE ON state. Engine 4 is inactive when key 18 is disengaged from key reception unit 16 and/or key 18 is engaged with key reception unit 16 in an ACCESSORIES ON state but not in an ENGINE ON state. If engine 4 is active, then the process ends in step S222.

Otherwise, if engine 4 is inactive, the process continues in step S214. In step S214, control unit 4 determines whether auxiliary battery 12 is operating in a warning condition. For example, auxiliary battery 12 can be operating in a warning condition when the engine is inactive and when a voltage of auxiliary battery 12 falls below a first predetermined voltage threshold, a power of auxiliary battery 12 falls below a first predetermined power threshold, and/or a current of auxiliary battery 12 falls below a first predetermined current threshold. For example, if the first predetermined threshold for auxiliary battery 12 is 6 volts and the voltage of auxiliary battery 12 is 5 volts, then auxiliary battery 12 is operating in a warning condition. Furthermore, auxiliary battery 12 could be operating in a warning condition when the engine is inactive when a first predetermined amount of time has expired from a triggering event, such as when accessories 14 is activated. For example, if the first predetermined amount of time is 30 minutes and more than 30 minutes has elapsed since accessories 14 was activated, then auxiliary battery 12 is operating in the warning condition when the engine is inactive. If auxiliary battery 12 is not operating in the warning condition, then the process repeats step S212.

If, however, auxiliary battery 12 is operating in the warning condition, then in step S216, control unit 10 provides a warning to a user using warning unit 20. The warning can be an audio or visual warning to indicate to the user that he should turn off or deactivate accessories 14. The warning can also be an audio or visual warning to indicate to the user that auxiliary battery 12 has a low state of charge. The warning can also indicate to the user that the user should activate engine 4 such as by engaging key 18 with key reception unit 16 in an ENGINE ON state. By activating engine 4, it is contemplated that engine 4 could recharge auxiliary battery 12.

In step S218, control unit 10 determines whether auxiliary battery 12 is operating in a shut off condition. Auxiliary battery 12 is operating in the shutoff condition when the engine is inactive and when a voltage of auxiliary battery 12 falls below a second predetermined voltage threshold, a power of auxiliary battery 12 falls below a second predetermined power threshold, and/or a current of auxiliary battery 12 falls below a second predetermined current threshold. The second voltage threshold is less than the first voltage threshold, the second power threshold is less than the first power threshold, and the second current threshold is less than the first current threshold.

Thus, if the first voltage threshold was 6 volts, then the second voltage threshold can be, for example, 4 volts. If the voltage of auxiliary battery 12 was 5 volts, then auxiliary battery 12 would be operating in the warning condition but not in the shut off condition since 5 volts is greater than the second voltage threshold of 4 volts. However, if the voltage of auxiliary battery 12 had dropped to 3 volts, then auxiliary battery 12 would be operating in the shut off condition since 3 volts is less than the second voltage threshold of 4 volts.

Furthermore, auxiliary battery 12 could be operating in a shutoff condition when the engine is inactive and when a second predetermined amount of time has expired from a triggering event, such as when accessories 14 is activated. The second predetermined amount of time can be a greater amount of time than the first predetermined amount of time. For example, if the first predetermined amount of time is 30 minutes and more than 40 minutes has elapsed since accessories 14 was activated, then auxiliary battery 12 is operating in the shutoff condition when the engine is inactive. If auxiliary battery 12 is not operating in the shut off condition, then the process repeats step S212.

If, however, auxiliary battery 12 is operating in the shut off condition, then in step S220, control unit 10 disengages switch 26 to disconnect auxiliary battery 12 from accessories 14. This may be especially useful when auxiliary battery 12 has a relatively low charge capacitance when compared to the electrical demands of accessories 14. That is, when accessories 14 may drain auxiliary battery 12 in a relatively short period of time such as in an hour or a few hours.

Optionally, control unit 10 can also display another warning to the user indicating that auxiliary battery 12 has been disconnected from accessories 14. The warning can also include instructions to activate engine 4 by engaging key 18 with key reception unit 16 in an ENGINE ON state. In step 222, the process ends.

In one embodiment, switch 24 can be engaged to replenish auxiliary battery 12 at either step S216 or step S220. This can be done, for example, only when control unit 10 detects that key 18 is engaged with key 16 and that there is sufficient energy within main battery 8 to replenish auxiliary battery 12.

Advantageously this can replenish auxiliary battery 12 while reducing the likelihood that main battery 8 is discharged because if key 18 is engaged with key reception unit 16, it is contemplated that the user is present. If the user is present, then the user can activate engine 4 to recharge auxiliary battery 12.

Furthermore, if the user is not present, then it may be less critical that accessories 14 remain active or have the ability to remain active. Also, if main battery 8 is a high voltage battery, then it may be beneficial to reduce the amount of time when main battery 8 is connected to auxiliary battery 12 such as when the user is not present in automobile 2.

In another embodiment, as soon as engine 4 is activated, the process moves to step S222 and ends. This is because as soon as engine 4 is activated, then engine 4 is used to recharge auxiliary battery 12. This may reduce the necessity for auxiliary battery 12 to be disconnected from accessories 14.

In yet another embodiment, key 18 can engage key reception unit 16 in a third state such as an IGNITION OFF state. During the IGNITION OFF state, switch 26 is disengaged, preventing power from flowing from auxiliary battery 12 to accessories 14. In such an embodiment, during an ACCESSORIES ON state and an ENGINE ON state, switch 26 is engaged allowing power to flow from auxiliary battery 12 to accessories 14.

Those of ordinary skill would appreciate that the various illustrative logical blocks, modules, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An automobile comprising: an electronic accessory; a first battery connected to the electronic accessory; and a control unit connected to the first battery, the control unit monitoring the first battery and disconnecting configured to enable a disconnection of the first battery from the electronic accessory when the first battery is in a first operational condition a first predetermined amount of time has elapsed from the electronic accessory being turned on, the control unit further configured to provide a warning to a user before enabling the disconnection of the first battery from the electronic accessory; and an engine, configured to be in an active state or an inactive state connected to the control unit, wherein the control unit is configured to enable the disconnection of the first battery from the electronic accessory when the engine is in the inactive state and when the first predetermined amount of time has elapsed from the electronic accessory being turned on.

2. The automobile of claim 1 further comprising: a switch configured to be engaged or disengaged, the switch connected to the engine and being controlled by the first battery; and a second battery connected to the switch, the second battery supplying power to the engine through the switch when the switch is engaged.

3. The automobile of claim 1 wherein the first battery is in the second operational condition the control unit is configured to provide the warning to the user when the engine is in the inactive state and when a second predetermined amount of time has elapsed from the electronic accessory being turned on, the second predetermined amount of time being less than the first predetermined amount of time.

4. The automobile of claim 2 further comprising a key reception unit connected to the control unit and configured to engage a key, the second battery recharging the first battery when the key is engaged with the key reception unit.

5. The automobile of claim 1 wherein the warning is selected from the group consisting of an audio warning, a visual warning, and an audiovisual warning.

6. The automobile of claim 1 wherein the warning notifies the user when the first battery will be disconnected from the electronic accessory.

7. The automobile of claim 1 wherein the warning notifies the user to activate the engine.

8. An automobile comprising: an electronic accessory; a first battery connected to the electronic accessory through a first switch, the first switch configured to be engaged or disengaged; a second battery connected to the first battery through a second switch, the second switch configured to be engaged or disengaged; an engine configured to be in an active state or an inactive state; a key reception unit for engaging with a key; and a control unit connected to the first battery and the key reception unit, the control unit configured to monitoring the first battery and the key reception unit, disengage the first switch for disconnecting the first battery from the electronic accessory when the first battery is in a first operational condition, engage the second switch for connecting the first battery to the second battery when the key is engaged with the key reception unit and provide a warning to a user when the first battery is in a second operational condition; wherein the first battery is in the first operational condition when an electric level of the first battery is below a first predetermined electric amount and the engine is in an inactive state, and the first battery is in the second operational condition when the electric level of the first battery is below a second predetermined electric amount greater than the first predetermined electric amount and the engine is in an inactive state.

9. The automobile of claim 8 wherein the electric level of the first battery is an amount of voltage remaining in the first battery, the first predetermined electric amount is a first predetermined amount of voltage and the second predetermined electric amount is a second predetermined amount of voltage.

10. The automobile of claim 8 wherein the electric level of the first battery is an amount of power remaining in the first battery, the first predetermined electric amount is a first predetermined amount of power and the second predetermined electric amount is a second predetermined amount of power.

11. The automobile of claim 8 wherein the electric level of the first battery is an amount of current remaining in the first battery, the first predetermined electric amount is a first predetermined amount of current and the second predetermined electric amount is a second predetermined amount of current.

12. The automobile of claim 8 wherein the first battery is in the first operational condition when the engine is in an inactive state and when a predetermined amount of time has elapsed from when the electronic accessory is turned on.

13. The automobile of claim 8 further comprising a third switch configured to be engaged or disengaged, the third switch being engaged or disengaged by the first battery and wherein the second battery is connected to the engine through the third switch.

14. A method for controlling a state of charge in an auxiliary battery connected to an electronic accessory in an automobile comprising the steps of: monitoring an elapsed time of operation of the electronic accessory; providing a warning to a user when the elapsed time of operation of the electronic accessory exceeds a first predetermined amount of time; and disconnecting the auxiliary battery from the electronic accessory when the elapsed time of operation of the electronic accessory exceeds a second predetermined amount of time, the second predetermined amount of time being greater than the first predetermined amount of time; and providing the warning to the user occurs when an engine of the automobile is in an inactive state, and disconnecting the auxiliary battery occurs when the engine of the automobile is in active state.

15. The method of claim 14 further comprising the step of recharging the auxiliary battery through a main battery when a key is engaged with a key reception unit.

16. The method of claim 14 wherein the warning notifies the user when the auxiliary battery will be disconnected from the electronic accessory.

\* \* \* \* \*